United States Patent
Oishi et al.

(10) Patent No.: US 9,439,021 B2
(45) Date of Patent: Sep. 6, 2016

(54) PROXIMITY DETECTION USING AUDIO PULSE

(71) Applicant: Sonos, Inc., Santa Barbara, CA (US)

(72) Inventors: Tetsuro Oishi, Santa Barbara, CA (US); William H. Bush, Santa Clarita, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 14/921,781

(22) Filed: Oct. 23, 2015

(65) Prior Publication Data

US 2016/0044437 A1 Feb. 11, 2016

Related U.S. Application Data

(63) Continuation of application No. 14/216,325, filed on Mar. 17, 2014, now Pat. No. 9,264,839.

(51) Int. Cl.
*H04S 7/00* (2006.01)
*H04R 3/04* (2006.01)
(Continued)

(52) U.S. Cl.
CPC ............. *H04S 7/307* (2013.01); *G06F 3/165* (2013.01); *H04R 1/323* (2013.01); *H04R 3/04* (2013.01); *H04R 3/12* (2013.01); *H04R 5/04* (2013.01); *H04R 27/00* (2013.01); *H04R 2227/001* (2013.01); *H04R 2227/003* (2013.01); *H04R 2227/005* (2013.01); *H04R 2430/03* (2013.01); *H04R 2499/13* (2013.01); *H04S 2420/07* (2013.01)

(58) Field of Classification Search
CPC .... H04S 7/301; H04S 7/302; H04S 2420/01; H04S 7/303; H04S 7/30; H04S 2400/11; H04S 3/00; H04S 5/005

USPC ......................................................... 381/303
See application file for complete search history.

(56) References Cited

U.S. PATENT DOCUMENTS 4,306,113 A 12/1981 Morton
4,504,704 A 3/1985 Ohyaba et al.
(Continued)

FOREIGN PATENT DOCUMENTS

EP 0772374 A2 5/1997
EP 1133896 B1 8/2002
(Continued)

OTHER PUBLICATIONS

Notice of Allowance mailed on Dec. 7, 2015, issued in connection with U.S. Appl. No. 14/216,325, filed Mar. 17, 2014, 7 pages.
(Continued)

*Primary Examiner* — Mark Blouin
(74) *Attorney, Agent, or Firm* — McDonnell Boehnen Hulbert & Berghoff LLP

(57) ABSTRACT

Embodiments described herein involve configuring a playback device based on the detection of a barrier in proximity to the playback device. One embodiment may involve receiving proximity data that includes an indication of a barrier that is proximate to a playback device; detecting that the barrier is within a threshold proximity to a first speaker of the playback device based on the indication of the barrier that is proximate to the playback device; in response to the detecting, setting a playback configuration of the playback device; and causing the playback device to play an audio content according to the playback configuration.

24 Claims, 7 Drawing Sheets

(51) Int. Cl.
*H04R 27/00* (2006.01)
*G06F 3/16* (2006.01)
*H04R 1/32* (2006.01)
*H04R 3/12* (2006.01)
*H04R 5/04* (2006.01)

(56) References Cited

U.S. PATENT DOCUMENTS

| | | |
|---|---|---|
| 4,592,088 A | 5/1986 | Shimada |
| 4,694,484 A | 9/1987 | Atkinson et al. |
| 4,995,778 A | 2/1991 | Bruessel |
| 5,218,710 A | 6/1993 | Yamaki et al. |
| 5,255,326 A | 10/1993 | Stevenson |
| 5,323,257 A | 6/1994 | Abe et al. |
| 5,386,478 A | 1/1995 | Plunkett |
| 5,553,147 A | 9/1996 | Pineau |
| 5,910,991 A | 6/1999 | Farrar |
| 5,923,902 A | 7/1999 | Inagaki |
| 6,256,554 B1 | 7/2001 | DiLorenzo |
| 6,404,811 B1 | 6/2002 | Cvetko et al. |
| 6,522,886 B1 | 2/2003 | Youngs et al. |
| 6,573,067 B1 | 6/2003 | Dib-Hajj et al. |
| 6,611,537 B1 | 8/2003 | Edens et al. |
| 6,631,410 B1 | 10/2003 | Kowalski et al. |
| 6,639,989 B1 | 10/2003 | Zacharov et al. |
| 6,643,744 B1 | 11/2003 | Cheng |
| 6,704,421 B1 | 3/2004 | Kitamura |
| 6,721,428 B1 | 4/2004 | Allred et al. |
| 6,757,517 B2 | 6/2004 | Chang |
| 6,766,025 B1 | 7/2004 | Levy et al. |
| 6,778,869 B2 | 8/2004 | Champion |
| 6,798,889 B1 | 9/2004 | Dicker et al. |
| 6,862,440 B2 | 3/2005 | Sampath |
| 6,916,980 B2 | 7/2005 | Ishida et al. |
| 6,931,134 B1 | 8/2005 | Waller, Jr. et al. |
| 6,985,694 B1 | 1/2006 | De Bonet et al. |
| 6,990,211 B2 | 1/2006 | Parker |
| 7,039,212 B2 | 5/2006 | Poling et al. |
| 7,058,186 B2 | 6/2006 | Tanaka |
| 7,072,477 B1 | 7/2006 | Kincaid |
| 7,103,187 B1 | 9/2006 | Neuman |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,312,785 B2 | 12/2007 | Tsuk et al. |
| 7,477,751 B2 | 1/2009 | Lyon et al. |
| 7,483,538 B2 | 1/2009 | McCarty et al. |
| 7,483,540 B2 | 1/2009 | Rabinowitz et al. |
| 7,489,784 B2 | 2/2009 | Yoshino |
| 7,490,044 B2 | 2/2009 | Kulkarni |
| 7,492,909 B2 | 2/2009 | Carter et al. |
| 7,519,188 B2 | 4/2009 | Berardi et al. |
| 7,529,377 B2 | 5/2009 | Nackvi et al. |
| 7,571,014 B1 | 8/2009 | Lambourne et al. |
| 7,590,772 B2 | 9/2009 | Marriott et al. |
| 7,630,500 B1 | 12/2009 | Beckman et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,664,276 B2 | 2/2010 | McKee |
| 7,676,044 B2 | 3/2010 | Sasaki et al. |
| 7,689,305 B2 | 3/2010 | Kreifeldt et al. |
| 7,742,740 B2 | 6/2010 | Goldberg et al. |
| 7,769,183 B2 | 8/2010 | Bharitkar et al. |
| 7,796,068 B2 | 9/2010 | Raz et al. |
| 7,835,689 B2 | 11/2010 | Goldberg et al. |
| 7,853,341 B2 | 12/2010 | McCarty et al. |
| 7,949,140 B2 | 5/2011 | Kino |
| 7,949,707 B2 | 5/2011 | Mcdowall et al. |
| 7,961,893 B2 | 6/2011 | Kino |
| 8,005,228 B2 | 8/2011 | Bharitkar et al. |
| 8,014,423 B2 | 9/2011 | Thaler et al. |
| 8,045,721 B2 | 10/2011 | Burgan et al. |
| 8,045,952 B2 | 10/2011 | Qureshey et al. |
| 8,050,652 B2 | 11/2011 | Qureshey et al. |
| 8,063,698 B2 | 11/2011 | Howard |
| 8,074,253 B1 | 12/2011 | Nathan |
| 8,103,009 B2 | 1/2012 | Mccarty et al. |
| 8,116,476 B2 | 2/2012 | Inohara |
| 8,126,172 B2 | 2/2012 | Horbach et al. |
| 8,131,390 B2 | 3/2012 | Braithwaite et al. |
| 8,139,774 B2 | 3/2012 | Berardi et al. |
| 8,144,883 B2 | 3/2012 | Pdersen et al. |
| 8,160,276 B2 | 4/2012 | Liao et al. |
| 8,160,281 B2 | 4/2012 | Kim et al. |
| 8,170,260 B2 | 5/2012 | Reining et al. |
| 8,175,292 B2 | 5/2012 | Aylward et al. |
| 8,175,297 B1 | 5/2012 | Ho et al. |
| 8,194,874 B2 | 6/2012 | Starobin et al. |
| 8,229,125 B2 | 7/2012 | Short |
| 8,233,632 B1 | 7/2012 | Macdonald et al. |
| 8,234,395 B2 | 7/2012 | Millington et al. |
| 8,238,578 B2 | 8/2012 | Aylward |
| 8,243,961 B1 | 8/2012 | Morrill |
| 8,265,310 B2 | 9/2012 | Berardi et al. |
| 8,270,620 B2 | 9/2012 | Christensen |
| 8,279,709 B2 | 10/2012 | Choisel et al. |
| 8,281,001 B2 | 10/2012 | Busam et al. |
| 8,290,185 B2 | 10/2012 | Kim |
| 8,291,349 B1 | 10/2012 | Park et al. |
| 8,300,845 B2 | 10/2012 | Zurek et al. |
| 8,306,235 B2 | 11/2012 | Mahowald |
| 8,325,931 B2 | 12/2012 | Howard et al. |
| 8,325,935 B2 | 12/2012 | Rutschman |
| 8,331,585 B2 | 12/2012 | Hagen et al. |
| 8,332,414 B2 | 12/2012 | Nguyen et al. |
| 8,391,501 B2 | 3/2013 | Khawand et al. |
| 8,401,202 B2 | 3/2013 | Brooking |
| 8,433,076 B2 | 4/2013 | Zurek et al. |
| 8,452,020 B2 | 5/2013 | Gregg et al. |
| 8,463,184 B2 | 6/2013 | Dua |
| 8,527,876 B2 | 9/2013 | Wood et al. |
| 8,577,045 B2 | 11/2013 | Gibbs |
| 8,577,048 B2 | 11/2013 | Chaikin et al. |
| 8,600,075 B2 | 12/2013 | Lim |
| 8,620,006 B2 | 12/2013 | Berardi et al. |
| 8,731,206 B1 | 5/2014 | Park |
| 8,755,538 B2 | 6/2014 | Kwon |
| 8,819,554 B2 | 8/2014 | Basso et al. |
| 8,831,244 B2 | 9/2014 | Apfel |
| 8,855,319 B2 | 10/2014 | Liu et al. |
| 8,879,761 B2 | 11/2014 | Johnson et al. |
| 8,903,526 B2 | 12/2014 | Beckhardt et al. |
| 8,914,559 B2 | 12/2014 | Kalayjian et al. |
| 8,930,005 B2 | 1/2015 | Reimann |
| 8,934,647 B2 | 1/2015 | Joyce et al. |
| 8,934,655 B2 | 1/2015 | Breen et al. |
| 8,965,033 B2 | 2/2015 | Wiggins |
| 8,965,546 B2 | 2/2015 | Visser et al. |
| 8,977,974 B2 | 3/2015 | Kraut |
| 8,984,442 B2 | 3/2015 | Pirnack et al. |
| 8,989,406 B2 | 3/2015 | Wong et al. |
| 8,995,687 B2 | 3/2015 | Marino, Jr. et al. |
| 9,020,153 B2 | 4/2015 | Britt, Jr. |
| 9,084,058 B2 | 7/2015 | Reilly et al. |
| 9,100,766 B2 * | 8/2015 | Soulodre ............... H04S 1/002 381/300 |
| 9,106,192 B2 | 8/2015 | Sheen et al. |
| 9,215,545 B2 | 12/2015 | Dublin et al. |
| 9,219,460 B2 | 12/2015 | Bush |
| 9,288,597 B2 | 3/2016 | Carlsson et al. |
| 9,300,266 B2 | 3/2016 | Grokop |
| 9,319,816 B1 | 4/2016 | Narayanan |
| 2001/0042107 A1 | 11/2001 | Palm |
| 2001/0043592 A1 | 11/2001 | Jimenez et al. |
| 2002/0022453 A1 | 2/2002 | Balog et al. |
| 2002/0026442 A1 | 2/2002 | Lipscomb et al. |
| 2002/0078161 A1 | 6/2002 | Cheng |
| 2002/0089529 A1 | 7/2002 | Robbin |
| 2002/0124097 A1 | 9/2002 | Isely et al. |
| 2003/0002689 A1 | 1/2003 | Folio |
| 2003/0157951 A1 | 8/2003 | Hasty |

(56) References Cited

U.S. PATENT DOCUMENTS

| | | |
|---|---|---|
| 2003/0161479 A1 | 8/2003 | Yang et al. |
| 2003/0179891 A1 | 9/2003 | Rabinowitz et al. |
| 2004/0024478 A1 | 2/2004 | Hans et al. |
| 2004/0237750 A1 | 12/2004 | Smith et al. |
| 2005/0147261 A1 | 7/2005 | Yeh |
| 2005/0157885 A1 | 7/2005 | Olney et al. |
| 2006/0008256 A1 | 1/2006 | Khedouri et al. |
| 2006/0026521 A1 | 2/2006 | Hotelling et al. |
| 2006/0195480 A1 | 8/2006 | Spiegelman et al. |
| 2006/0225097 A1 | 10/2006 | Lawrence-Apfelbaum |
| 2007/0003067 A1 | 1/2007 | Gierl et al. |
| 2007/0038999 A1 | 2/2007 | Millington et al. |
| 2007/0121955 A1 | 5/2007 | Johnston et al. |
| 2007/0142944 A1 | 6/2007 | Goldberg et al. |
| 2008/0002839 A1 | 1/2008 | Eng |
| 2008/0098027 A1 | 4/2008 | Aarts |
| 2008/0144864 A1* | 6/2008 | Huon ............ H04R 1/20 381/305 |
| 2008/0175411 A1 | 7/2008 | Greve |
| 2009/0024662 A1 | 1/2009 | Park et al. |
| 2009/0047993 A1 | 2/2009 | Vasa |
| 2009/0063274 A1 | 3/2009 | Dublin, III et al. |
| 2009/0110218 A1 | 4/2009 | Swain |
| 2009/0138507 A1 | 5/2009 | Burckart et al. |
| 2009/0304205 A1 | 12/2009 | Hardacker et al. |
| 2010/0142735 A1 | 6/2010 | Yoon et al. |
| 2010/0146445 A1 | 6/2010 | Kraut |
| 2010/0195846 A1 | 8/2010 | Yokoyama |
| 2010/0272270 A1 | 10/2010 | Chaikin et al. |
| 2011/0087842 A1 | 4/2011 | Lu et al. |
| 2011/0091055 A1 | 4/2011 | Leblanc |
| 2011/0170710 A1 | 7/2011 | Son |
| 2011/0234480 A1 | 9/2011 | Fino et al. |
| 2012/0051558 A1 | 3/2012 | Kim et al. |
| 2012/0127831 A1 | 5/2012 | Gicklhorn et al. |
| 2012/0148075 A1 | 6/2012 | Goh et al. |
| 2012/0263325 A1 | 10/2012 | Freeman et al. |
| 2012/0268145 A1 | 10/2012 | Chandra et al. |
| 2012/0288124 A1 | 11/2012 | Fejzo et al. |
| 2013/0010970 A1 | 1/2013 | Hegarty et al. |
| 2013/0028443 A1 | 1/2013 | Pance et al. |
| 2013/0051572 A1 | 2/2013 | Goh et al. |
| 2013/0066453 A1 | 3/2013 | Seefeldt |
| 2013/0108055 A1 | 5/2013 | Hanna et al. |
| 2013/0129122 A1 | 5/2013 | Johnson et al. |
| 2013/0202131 A1 | 8/2013 | Kemmochi et al. |
| 2013/0211843 A1 | 8/2013 | Clarkson |
| 2013/0216071 A1 | 8/2013 | Maher et al. |
| 2013/0223642 A1 | 8/2013 | Warren et al. |
| 2013/0230175 A1 | 9/2013 | Bech et al. |
| 2013/0259254 A1 | 10/2013 | Xiang et al. |
| 2013/0279706 A1 | 10/2013 | Marti |
| 2013/0305152 A1 | 11/2013 | Griffiths et al. |
| 2014/0003622 A1 | 1/2014 | Ikizyan et al. |
| 2014/0003625 A1 | 1/2014 | Sheen et al. |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0037097 A1 | 2/2014 | Labosco |
| 2014/0064501 A1 | 3/2014 | Olsen et al. |
| 2014/0079242 A1 | 3/2014 | Nguyen et al. |
| 2014/0112481 A1 | 4/2014 | Li et al. |
| 2014/0161265 A1 | 6/2014 | Chaikin et al. |
| 2014/0192986 A1 | 7/2014 | Lee et al. |
| 2014/0219456 A1 | 8/2014 | Morrell et al. |
| 2014/0219483 A1 | 8/2014 | Hong |
| 2014/0226823 A1 | 8/2014 | Sen et al. |
| 2014/0242913 A1 | 8/2014 | Pang |
| 2014/0267148 A1 | 9/2014 | Luna et al. |
| 2014/0270202 A1 | 9/2014 | Ivanov et al. |
| 2014/0270282 A1 | 9/2014 | Tammi et al. |
| 2014/0273859 A1 | 9/2014 | Luna et al. |
| 2014/0279889 A1 | 9/2014 | Luna |
| 2014/0285313 A1 | 9/2014 | Luna et al. |
| 2014/0286496 A1 | 9/2014 | Luna et al. |
| 2014/0294200 A1 | 10/2014 | Baumgarte et al. |
| 2014/0321670 A1 | 10/2014 | Nystrom et al. |
| 2014/0341399 A1 | 11/2014 | Dusse et al. |
| 2014/0344689 A1 | 11/2014 | Scott et al. |
| 2014/0355768 A1 | 12/2014 | Sen et al. |
| 2014/0355794 A1 | 12/2014 | Morrell et al. |
| 2015/0032844 A1 | 1/2015 | Tarr et al. |
| 2015/0036847 A1 | 2/2015 | Donaldson |
| 2015/0036848 A1 | 2/2015 | Donaldson |
| 2015/0043736 A1 | 2/2015 | Olsen et al. |
| 2015/0063610 A1 | 3/2015 | Mossner |
| 2015/0078586 A1 | 3/2015 | Ang et al. |
| 2015/0092959 A1 | 4/2015 | Agustin et al. |
| 2015/0100991 A1 | 4/2015 | Risberg et al. |
| 2015/0146886 A1 | 5/2015 | Baumgarte |
| 2015/0201274 A1 | 7/2015 | Ellner et al. |
| 2015/0281866 A1 | 10/2015 | Williams et al. |
| 2016/0007116 A1 | 1/2016 | Holman |
| 2016/0021458 A1 | 1/2016 | Johnson et al. |
| 2016/0029142 A1 | 1/2016 | Isaac |

FOREIGN PATENT DOCUMENTS

| | | |
|---|---|---|
| EP | 2043381 A2 | 4/2009 |
| EP | 1349427 B1 | 12/2009 |
| EP | 2161950 A2 | 3/2010 |
| EP | 2194471 A1 | 6/2010 |
| EP | 1825713 B1 | 10/2012 |
| EP | 2591617 B1 | 6/2014 |
| EP | 2860992 A1 | 4/2015 |
| KR | 1020060116383 | 11/2006 |
| KR | 1020080011831 | 2/2008 |
| WO | 0153994 A2 | 7/2001 |
| WO | 2007016465 A2 | 2/2007 |
| WO | 2015024881 A1 | 2/2015 |
| WO | 2015178950 A1 | 11/2015 |

OTHER PUBLICATIONS

Non-Final Office Action mailed on Dec. 7, 2015, issued in connection with U.S. Appl. No. 14/921,762, filed Oct. 23, 2015, 5 pages.
First Action Interview Pilot Program Pre-Interview Communication mailed on Feb. 16, 2016, issued in connection with U.S. Appl. No. 14/681,465, filed Apr. 8, 2015, 5 pages.
Notice of Allowance mailed on Feb. 26, 2016, issued in connection with U.S. Appl. No. 14/921,762, filed Oct. 23, 2015, 7 pages.
Notice of Allowance mailed on Apr. 12, 2016, issued in connection with U.S. Appl. No. 14/681,465, filed Apr. 8, 2015, 13 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity" Core, Version 1.0 A, Jul. 26, 1999, 1068 pages.
Bluetooth. "Specification of the Bluetooth System: Wireless connections made easy" Core, Version 1.0 B, Dec. 1, 1999, 1076 pages.
"Constellation Acoustic System: a revolutionary breakthrough in acoustical design" Meyer Sound Laboratories, Inc., 2012, 32 pages.
"Constellation Microphones," Meyer Sound Laboratories, Inc., 2013, 2 pages.
Dell, Inc. "Dell Digital Audio Receiver: Reference Guide" Jun. 2000, 70 pages.
Dell, Inc. "Start Here" Jun. 2000, 2 pages.
International Bureau, International Preliminary Report on Patentability, mailed Sep. 24, 2015, issued in connection with International Application No. PCT/US2014/030560, filed on Mar. 17, 2014, 7 pages.
International Searching Authority, International Search Report and Written Opinion mailed on Jun. 16, 2015, issued in connection with International Application No. PCT/US2015/020993, filed on Mar. 17, 2015, 11 pages.

(56) References Cited

OTHER PUBLICATIONS

Jo, J. et al., "Synchronized One-to-many Media Streaming with Adaptive Playout Control," Proceedings of SPIE, 2002, pp. 71-82, vol. 4861.
Jones, Stephen. "Dell Digital Audio Receiver: Digital upgrade for your analog stereo" Analog Stereo. Jun. 24, 2000 retrieved Jun. 18, 2014, 2 pages.
Louderback, Jim. "Affordable Audio Receiver Furnishes Homes With MP3" TechTV Vault. Jun. 28, 2000 retrieved Jul. 10, 2014, 2 pages.
Non-Final Office Action mailed on Oct. 14, 2015, issued in connection with U.S. Appl. No. 14/216,325, filed Mar. 17, 2014, 7 pages.
Palm, Inc. "Handbook for the Palm VII Handheld" May 2000, 311 pages.
"Presentations at WinHEC 2000" May 2000, 138 pages.
Ross, Alex. "Wizards of Sound: Retouching acoustics, from the restaurant to the concert hall" The New Yorker, Feb. 23, 2015. Web. Feb. 26, 2015.
UPnP; "Universal Plug and Play Device Architecture"; Jun. 8, 2000; version 1.0; Microsoft Corporation; pp. 1-54.
Co-pending U.S. Appl. No. 14/481,505, filed Sep. 9, 2014.
Co-pending U.S. Appl. No. 14/481,522, filed Sep. 9, 2014.
Co-pending U.S. Appl. No. 14/696,014, filed Apr. 24, 2015.
Co-pending U.S. Appl. No. 14/696,366, filed Apr. 24, 2015.
Co-pending U.S. Appl. No. 14,811,587, filed Jul. 28, 2015.
Final Office Action mailed on Dec. 18, 2014, issued in connection with U.S. Appl. No. 13/340,126, filed Dec. 29, 2011, 12 pages.
First Action Interview Pilot Program Pre-Interview Communication mailed on Oct. 7, 2015, issued in connection with U.S. Appl. No. 14/216,306, filed Mar. 17, 2014, 5 pages.
International Searching Authority, International Search Report and Written Opinion mailed on Jun. 5, 2015, issued in connection with International Application No. PCT/US2015/021000, filed on Mar. 17, 2015, 12 pages.
Non-Final Office Action mailed on Jun. 2, 2014, issued in connection with U.S. Appl. No. 13/340,126, filed on Dec. 29, 2011, 14 pages.
Notice of Allowance mailed on Mar. 11, 2015, issued in connection with U.S. Appl. No. 13/340,126, filed on Dec. 29, 2011, 7 pages.
Notice of Allowance mailed on Oct. 29, 2015, issued in connection with U.S. Appl. No. 14/216,306, filed Mar. 17, 2014, 9 pages.
Burger, Dennis, "Automated Room Correction Explained" hometheaterreview.com, Nov. 18, 2013, Retrieved Oct. 10, 2014, 3 pages.
Daddy, B., "Calibrating Your Audio with a Sound Pressure Level (SPL) Meter," Blue-ray.com, Feb. 22, 2008 Retrieved Oct. 10, 2014, 15 pages.
International Searching Authority, International Search Report and Written Opinion mailed on Nov. 18, 2015, issued in connection with International Application No. PCT/US2015/048954, filed on Sep. 8, 2015, 11 pages.
Microsoft; Corporation., "Using Microsoft Outlook 2003", Cambridge College, 2003.
Motorola., "Simplefi, Wireless Digital Audio Receiver, Installation and User Guide", Dec. 31, 2001, 111 pages.
Mulcahy, John, "Room EQ Wizard: Room Acoustics Software" REW 2014 Retrieved Oct. 10, 2014, 4 pages.
Non-Final Action mailed on Jan. 29, 2016, issued in connection with U.S. Appl. No. 14/481,511, filed on Sep. 9, 2014, 10 pages.
Non-Final Office Action mailed on Nov. 21, 2014, issued in connection with U.S. Appl. No. 13/536,493, filed Jun. 28, 2012, 20 pages.
Notice of Allowance mailed on Apr. 10, 2015, issued in connection with U.S. Appl. No. 13/536,493, filed Jun. 28, 2012, 8 pages.
PRISMIQ; Inc., "PRISMIQ Media Player User Guide", 2003, 44 pages.
Non-Final Office Action mailed on Jul. 6, 2016, issued in connection with U.S. Appl. No. 15/070,160, filed Mar. 15, 2016, 6 pages.
Non-Final Office Action mailed on Jul. 7, 2016, issued in connection with U.S. Appl. No. 15/066,049, filed Mar. 10, 2016, 6 pages.
Non-Final Office Action mailed on Jun. 21, 2016, issued in connection with U.S. Appl. No. 14/678,248, filed Apr. 3, 2015, 10 pages.
Notice of Allowance mailed on Jun. 3, 2016, issued in connection with U.S. Appl. No. 14/921,799, filed Oct. 23, 2015, 8 pages.

\* cited by examiner

PROXIMITY DETECTION USING AUDIO PULSE

CROSS REFERENCE TO RELATED APPLICATIONS

This application claims priority under 35 U.S.C. §120 to, and is a continuation of, U.S. non-provisional patent application Ser. No. 14/216,325, filed on Mar. 17, 2014, entitled "Playback Device Configuration Based on Proximity Detection," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
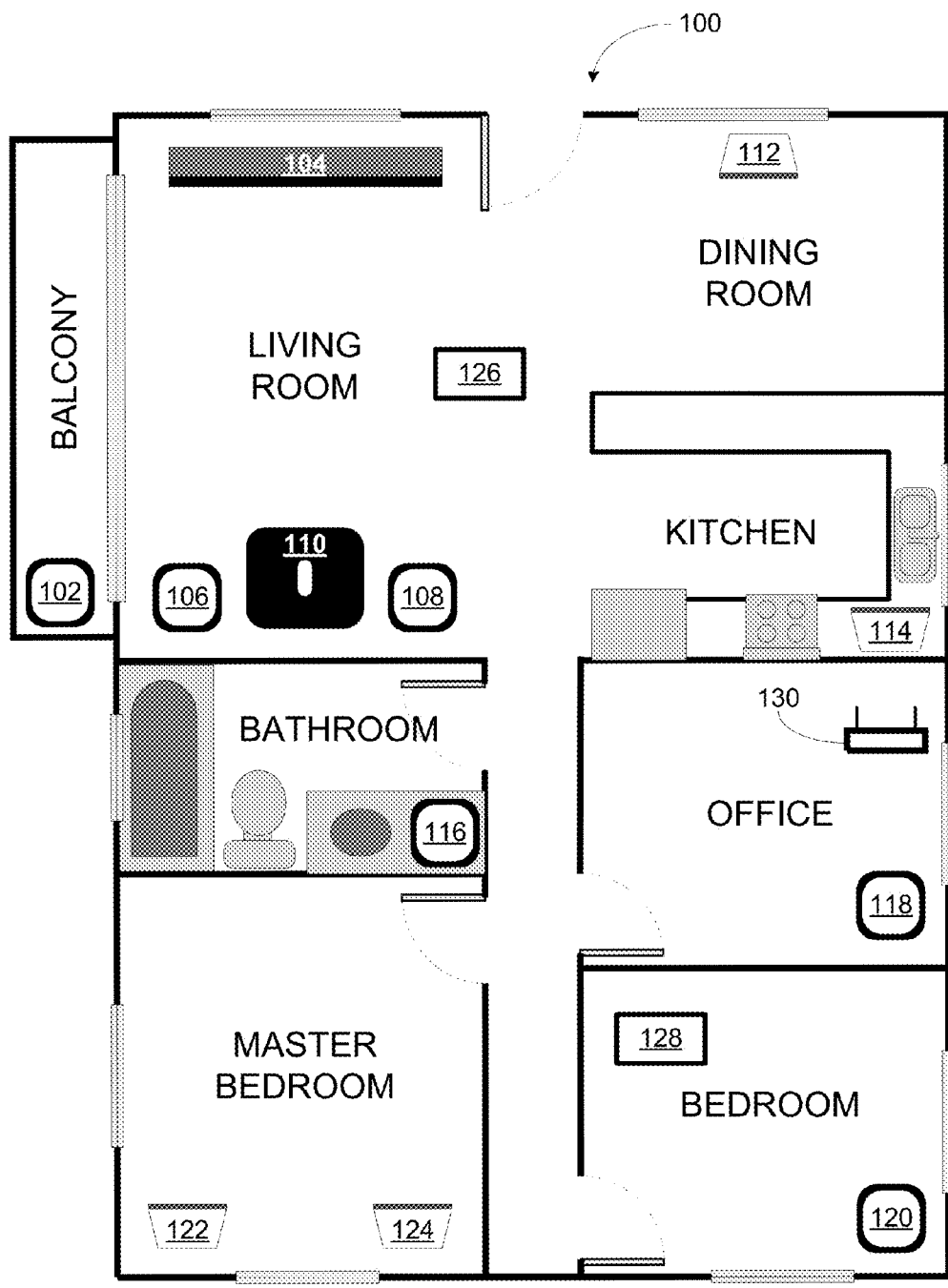
FIG. 1 shows an example media playback system configuration in which certain embodiments may be practiced.

The drawings are for the purpose of illustrating example embodiments, but the inventions are not limited to the arrangements and instrumentality shown in the drawings.

DETAILED DESCRIPTION

I. Overview

Embodiments described herein involve dynamically configuring a playback device based on the detection, by the playback device, of a barrier in proximity to the playback device. In practice, playback devices are positioned in a variety of places throughout various locations, such as a home or business. In many cases, other objects are placed on or around the playback device, either intentionally or unintentionally. For example, various household items, such as picture frames and potted plants, may be placed near the playback device. In some circumstances, placing a particular object near the playback device is merely convenient, while in other circumstances, the particular object is used to hide the playback device. In other cases, the playback device is placed near a wall or inside an object, such as a cabinet. In any such case, the playback device's surroundings may act as a barrier to the audio output of the playback device.

In some circumstances, when a barrier, such as an object or wall, is in proximity to the playback device, the barrier can affect the audio output of the playback device. For example, an object placed in front of a speaker of the playback device may distort the audio output of the speaker. Such distortion may lead to certain disadvantageous results, including degraded user experience.

Thus, according to some embodiments described herein, a playback device is dynamically configured to help compensate for the presence of a barrier when the playback device detects that a barrier is within a close proximity of the playback device. To dynamically respond to barriers placed in proximity to the playback device, the playback device may repeat the steps described herein as appropriate. For instance, if a barrier is placed in proximity to a speaker of a playback device, the device may adjust the playback configuration based on that barrier. If the barrier is removed, the playback device may dynamically adjust the playback configuration back to the original playback configuration. Or, if a second barrier is placed in proximity to another speaker, then the playback device may dynamically adjust the playback configuration on the basis of both barriers. As barriers move in and out of proximity with the playback device, the playback device may change its playback configuration accordingly.

In some embodiments, dynamic configuration of the playback device involves deactivating a speaker of the playback device. For example, a particular speaker of the playback device may be deactivated when a barrier is detected within close proximity to the particular speaker. In other embodiments, configuration of the playback device involves modifying the sound output of a particular speaker to help compensate for the presence of a barrier detected within close proximity to the particular speaker. As one example, the playback device may adjust high range frequency components of the audio output to compensate for distortion of the perceived frequency response of the playback device within that high frequency range caused by the barrier. In other embodiments, configuration of the playback device involves deactivating a first speaker and modifying the sound output of a second speaker. In one example, the first and second speakers may be part of the same playback device. In another example, the first speaker is part of a first playback device, and the second speaker is part of a second playback device.

Other examples and aspects of compensating for the presence of the barrier are more fully described below.

As indicated above, the present application involves dynamically configuring a playback device based on the detection of a barrier in proximity to the playback device. In one aspect, a method is provided. The method involves a playback device receiving proximity data that includes an indication of a barrier that is proximate to a playback device. The method further involves the playback device detecting that the barrier is within a threshold proximity to a first speaker of a playback device based on the indication of the barrier proximate to the playback device. Based on the detecting, the method involves setting a playback configuration of the playback device. The method also involves causing the playback device to play an audio content according to the playback configuration.

In another aspect, a playback device is provided. The playback device includes a first speaker, a second speaker, a processor, a data storage, and a program logic. The program logic is stored in the data storage and executable by the processor to (i) receive proximity data that includes an indication of a barrier that is proximate to the playback device; and (ii) detect that the barrier is within a threshold proximity to the first speaker based on the indication of the barrier proximate to the playback device, where the first speaker is configured to play a component of an audio content. Based on the detecting, the program logic is further executable to (i) cause the first speaker to be deactivated and (ii) cause the second speaker to play at least a portion of the component of the audio content.

In yet another aspect, a non-transitory computer readable memory is provided. The non-transitory computer readable memory has stored thereon instructions executable by a playback device to cause the playback device to perform functions. The functions include receiving proximity data that includes an indication of a barrier that is proximate to a playback device, and detecting that the barrier is within a threshold proximity to a first speaker of a playback device based on the indication of the barrier proximate to the playback device. Based on the detecting, the functions further include setting a playback configuration of the playback device; and causing the playback device to play an audio content according to the playback configuration.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
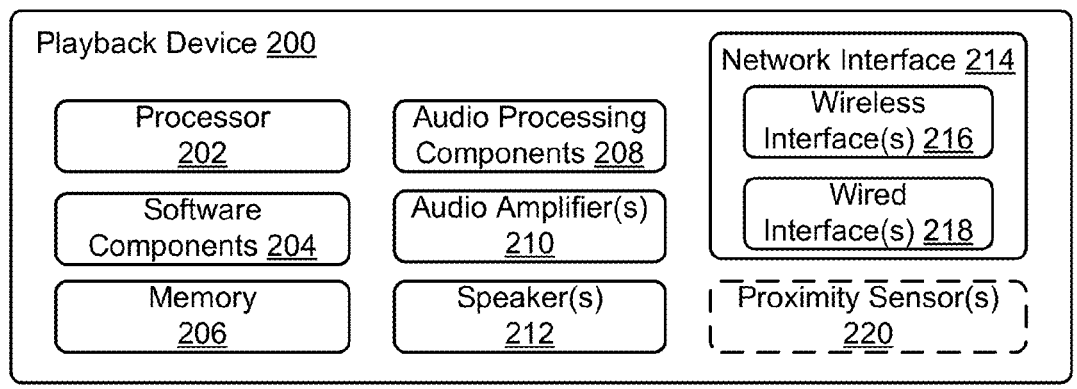
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and proximity sensor(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In some embodiments, the playback device 200 includes one or more proximity sensor(s) 220. As a general matter, proximity sensor(s) 220 may be configured to generate signals indicating the presence of objects within the range of the proximity sensor(s) 220. In some embodiments, the signals indicating the presence of objects may be processed into digital proximity data. For example, where the signals indicating the presence of objects are analog signals, the signals may be converted using an analog-to-digital converter into digital proximity data. Proximity sensor(s) 220 may further be configured to generate data indicating absolute, relative, and/or approximate distances of objects from the proximity sensor. Proximity sensor(s) 220 may include one or more of (i) a microphone; (ii) a capacitive sensor; (iii) an infrared (IR) sensor; or (iv) a camera, among other examples. And the proximity sensors may be configured to perform functions in addition to those explicitly discussed herein.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
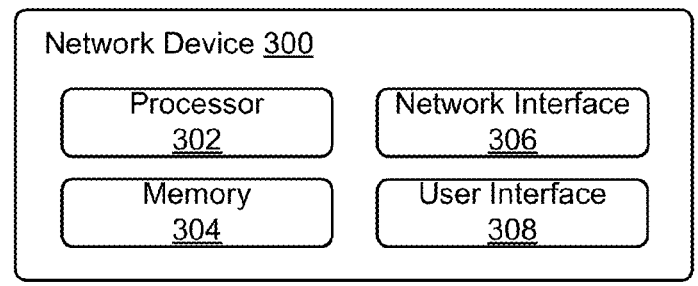
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
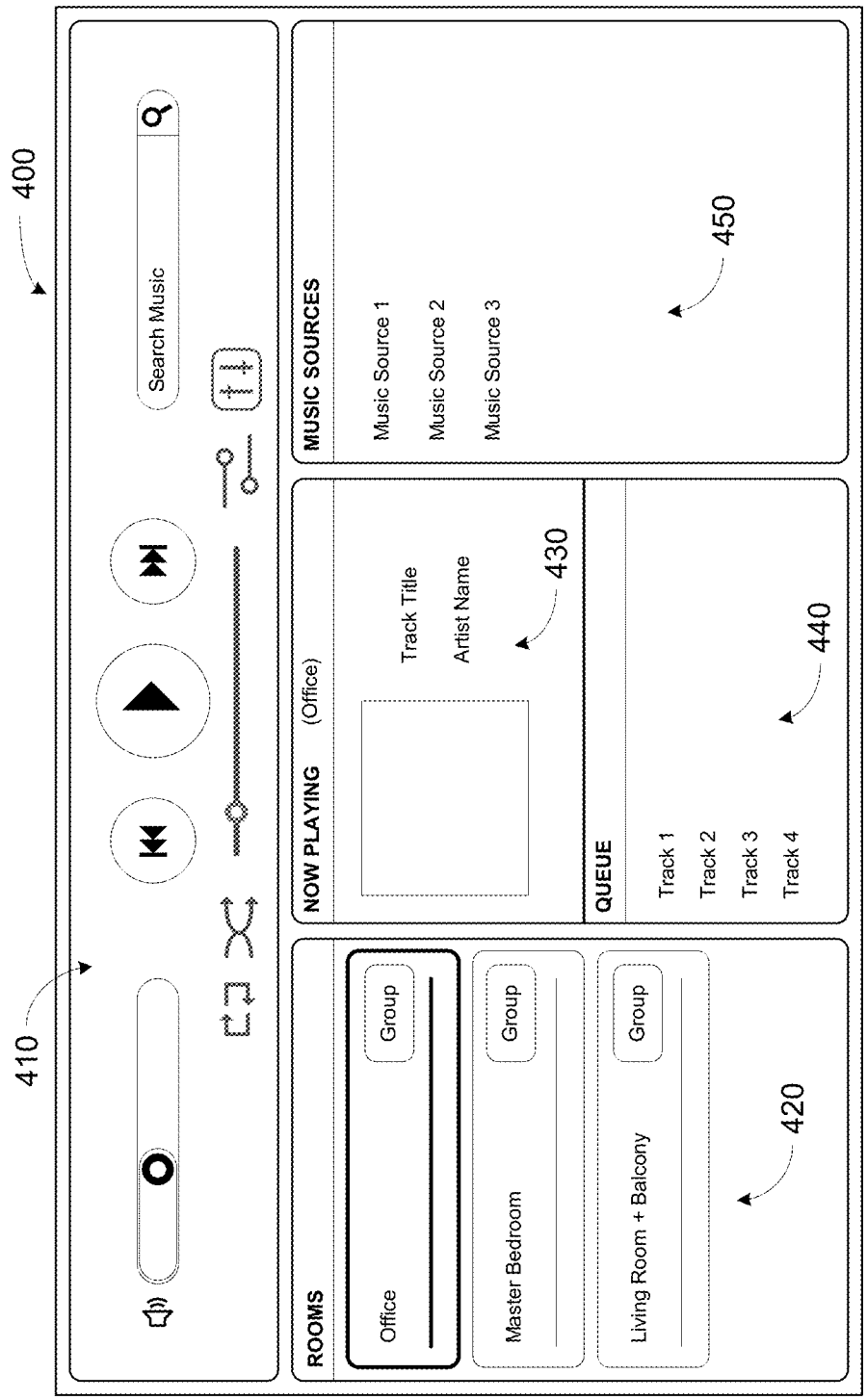
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method

As discussed above, embodiments described herein may involve dynamically configuring a playback device based on the detection of a barrier in proximity to the playback device.

Figure 5:
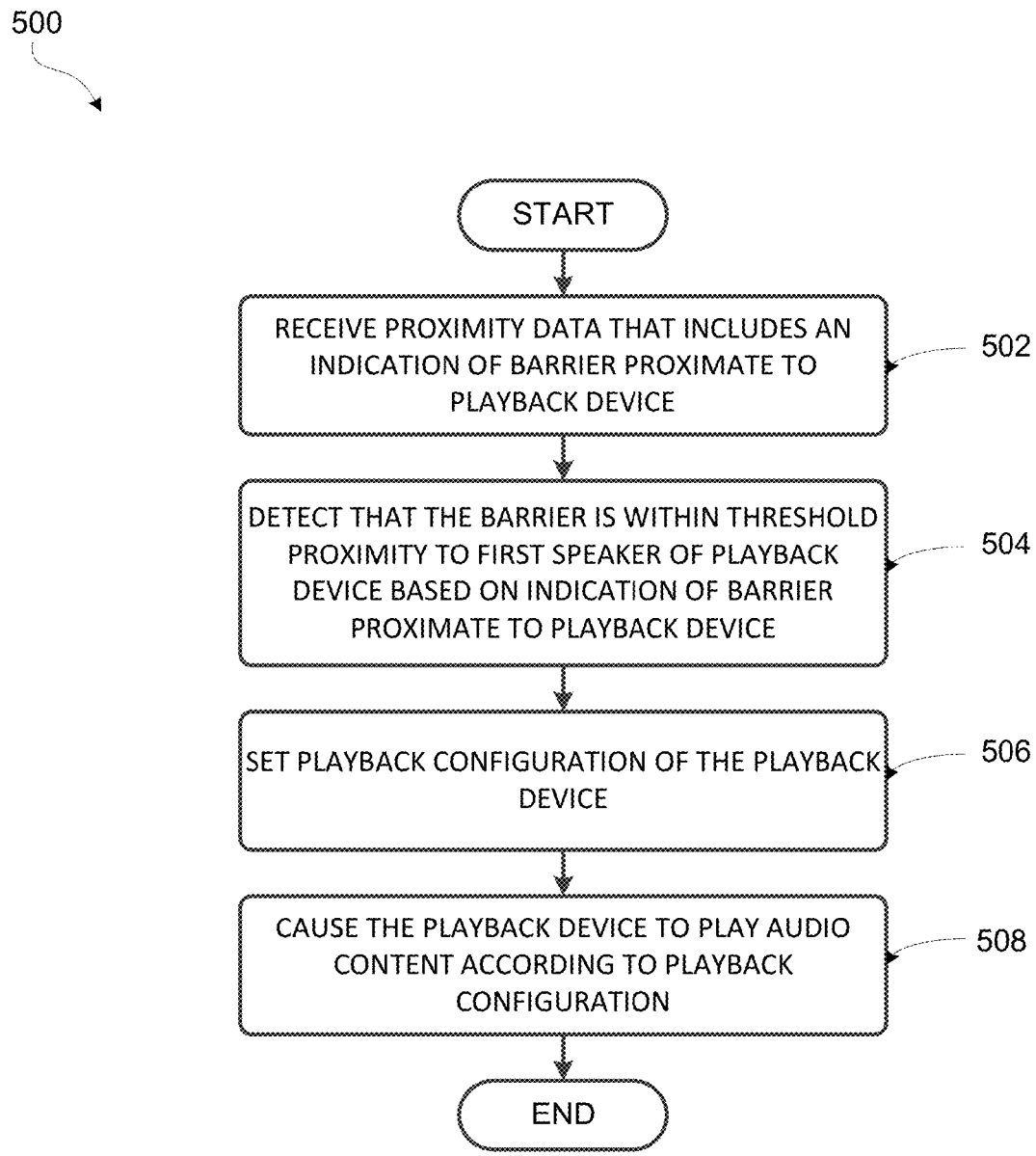
FIG. 5 shows an example flow diagram for playback configuration based on barrier proximity.

Method 500 shown in FIG. 5 presents an embodiment of a method that can be implemented within an operating environment involving, for example, the media playback system 100 of FIG. 1, one or more of the playback device(s) 200 of FIG. 2, and one or more of the control device(s) 300 of FIG. 3. Method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

a. Receiving Proximity Data that Includes an Indication of a Barrier that is Proximate to a Playback Device At block 502, the playback device receives proximity data that includes an indication of a barrier that is proximate to a playback device. In some embodiments, the proximity data is received from a sensor internal to the playback device. In other embodiments, the proximity data is received from one or more external sensors that are coupled to the playback device. Other arrangements are possible as well.

Any object that is in physical proximity to the playback device may act as a barrier. For instance, various household items, such as picture frames and potted plants, may act as barriers. Alternatively, when the playback device is placed next to a wall, the wall may act as a barrier. Similarly, when the playback device is placed inside a cabinet, one or more sides of the cabinet may act as a barrier.

Figure 6:
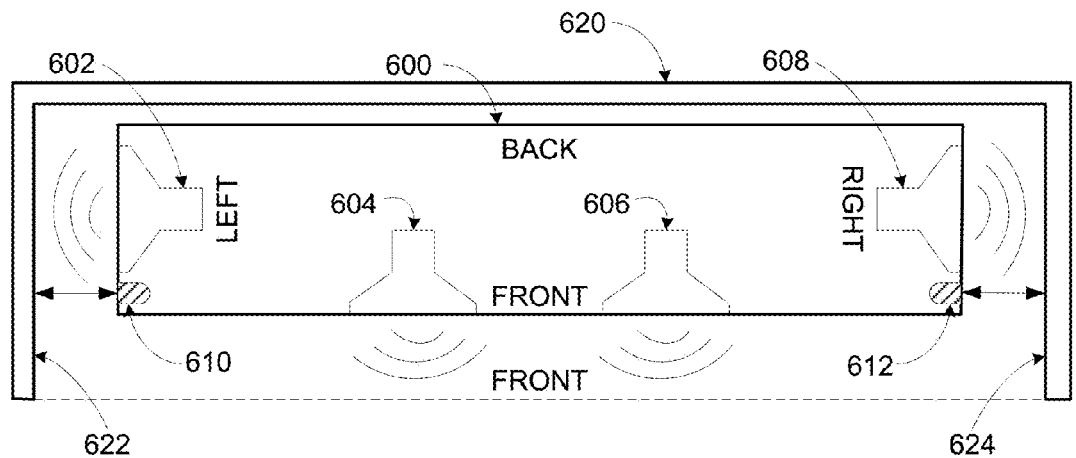
FIG. 6 shows an example arrangement of a playback device.

FIG. 6 shows a top-down view of an example arrangement of a playback device 600 in a cabinet 620. As viewed from the above, the cabinet 620 is enclosed on the top, left, and right sides, and open on the bottom side, as shown. When viewed from the side, the bottom side of cabinet 620 may be considered the front of the cabinet, as indicated. Further, the front of playback device 620 is oriented towards the front of the cabinet, as shown.

Playback device 600 includes speakers 602, 604, 606, and 608. Speakers 604 and 606 are arranged to output sound towards the front of the cabinet 620. Speakers 602 and 608 are arranged to output sound towards the left and to the right of playback device, respectively. Such an arrangement of multi-directional speakers may have the potential benefits of widening the sound field of the playback device and/or increasing a stereo effect of the audio output of the playback device, in conventional implementations.

Further, the sides of the cabinet are in physical proximity to playback device 600, as shown. Specifically, the left wall 622 of cabinet 620 is in physical proximity to the left side of playback device 600 upon which speaker 602 is arranged. Similarly, the right wall 624 of cabinet 620 is in physical proximity to the right side of the playback device 600 upon which speaker 608 is arranged.

In the above arrangement, when playback device 600 is in operation, the left wall 622 and the right wall 624 may each act as a barrier to audio output from playback device 600. As a result, the walls of cabinet 620, including at least the left wall 622 and the right wall 624 of the cabinet 620, may affect audio output from speakers 602 and 608.

Figure 7:
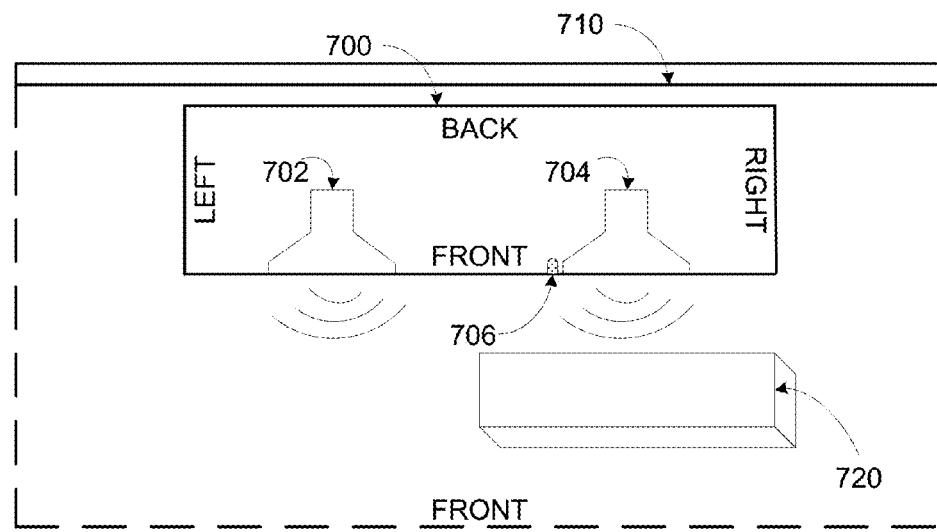
FIG. 7 shows another example arrangement of a playback device.

FIG. 7 shows a top-down view of another example arrangement of a playback device 700 on a shelf 710. As viewed from above, shelf 710 is closed on the back side, but is open on the left, right, and bottom sides, as shown. If viewed from the side, the bottom side of shelf 710 may be considered the front of the cabinet, as marked. The front of playback device 720 is oriented towards the front of the cabinet, as shown. The playback device includes speakers 702 and 704. Speakers 702 and 704 are arranged to output sound towards the front of the shelf 710.

In the example arrangement of FIG. 7, a barrier 720 is positioned in front of playback device 700, as shown. Barrier 720 may be considered to be in proximity to playback device 700. In this arrangement, barrier 720 may affect audio output from playback device 700. Particularly, audio output from speaker 704 may be affected by barrier 720.

As one having skill in the art will appreciate, the barrier is not required to physically and/or completely block and/or prevent audio output from the playback device. While in some circumstances, the barrier may absorb some of the audio output of the playback device, in other circumstances, the barrier may cause reflection of the audio output, among other examples. In either case, the barrier may cause some effect on the audio output of the playback device, such as muffling, distorting, or otherwise impacting the audio output.

The indication of a barrier in the proximity data may be any suitable data that indicates the presence of a barrier in proximity to the playback device. For example, the indication may be particular data or a particular change in data that indicates the presence of a barrier, depending on the type of proximity sensor. In some embodiments, the proximity data directly indicates the presence of a barrier. For example, the proximity sensor may identify that a barrier is present and send data in the form of a message to the playback device indicating the barrier. In other embodiments, the presence of a barrier is inferred from the proximity data. For example, data from a capacitive sensor may indicate an increase in capacitance from which the presence of a barrier may be inferred. Or data from a microphone may indicate an increase in reflected audio picked up by the microphone.

In some embodiments, the proximity data is a portion of a data stream formed by a proximity sensor that regularly monitors its environment for the presence of objects. In such embodiments, the proximity sensor may continuously, periodically, or intermittently generate proximity data. In other embodiments, the proximity sensor may generate proximity data in response to an event, such as the addition of a new playback device to a media playback system. Such data collection may assist the playback device in responding dynamically to the presence of barriers.

For example, the one or more proximity sensors may include one or more of (i) a microphone; (ii) a capacitive sensor; (iii) an infrared (IR) sensor; or (iv) a camera. Other types of proximity sensors are possible as well.

As one example, an infrared sensor may include an LED and a photo detector. In operation, the LED emits an infrared beam. When the infrared beam encounters an object, a portion of the beam may be reflected back into the photo detector. From reflected beam, the infrared sensor may generate data indicative of the distance that the infrared proximity sensor is from the object from which the infrared beam reflected. To reduce noise caused by other sources of infrared light, the LED may be configured to emit the infrared beam at a particular frequency. In turn, the photo detector may be configured to detect infrared light at the particular frequency. Certain infrared sensors may be rated to a particular range. Beyond the rated range, the reflected IR beam may be too weak for the photo detector to capture with acceptable accuracy.

Returning to FIG. 6, playback device 600 includes infrared proximity sensors 610 and 612. Proximity sensors 610 and 612 are each configured to generate data indicating the physical distance of objects within range of the each respective sensor. In the arrangement of FIG. 6, playback device 600 may receive proximity data from each of proximity sensors 610 and 612. For example, playback device 600 may receive proximity data from proximity sensor 610 that includes an indication of left wall 622. Similarly, playback device 600 may receive proximity data from proximity sensor 612 that includes an indication of right wall 624.

In some embodiments, the one or more proximity sensors may include more than one type of proximity sensor. Arranging more than one type of sensor may help improve the accuracy of detecting objects and/or may assist with detecting objects of different materials. For example, an IR sensor may be more sensitive to certain materials, such as plastic or wood, while an inductive sensor may be more sensitive to other materials, such as metal.

In an embodiment, receiving proximity data that includes an indication of a barrier that is proximate to a playback device may involve outputting an audio signal (such as a pulse) from one or more speakers of the playback device. The playback device may then receive data that is indicative of the reflected audio signal from one or more microphones, where the reflected audio signal corresponds to the outputted audio signal. The playback device may then use the received reflected audio signal to determine whether a barrier is proximate to the playback device.

For example, the playback device may output an audio pulse. When the playback device is in a room, the audio pulse reflects off of the walls of the room and objects within the room. If a barrier is in proximity to the playback device, the reflections of the audio pulse indicate the barrier. At least a portion of the reflected audio pulse may enter the one or more microphones which capture the portion of reflected audio pulse as data indicative of the reflected audio pulse. The data indicative of a reflected audio pulse from the one or more microphones may be the proximity data. Alternatively, the data indicative of a reflected audio pulse from the one or more microphones may undergo additional processing to become the proximity data. For instance, a Laplace transform may be performed on the data indicative of a reflected audio pulse from the one or more microphones to determine a frequency response. The frequency response of the audio playback device may be used to infer the presence of the barrier. For example, a frequency response that is distorted in high frequency range may indicate the presence of a barrier.

Returning to FIG. 7, playback device 700 includes a microphone 706. Speaker 704 may output an audio signal. Some of the audio signal may reflect off of barrier 720. Microphone 706 may capture at least some of the reflected audio signal and convert the reflected audio signal into proximity data. Playback device 700 may then receive the proximity data that indicative of a reflected audio signal from microphone 706.

b. Detecting that the Barrier is within a Threshold Proximity to a First Speaker of the Playback Device Based on the Indication of the Barrier Proximate to the Playback Device At block 504, the playback device detects that the barrier is within a threshold proximity to a first speaker of the playback device based on the indication of the barrier proximate to the playback device.

The threshold proximity may be a condition that indicates that the barrier is close enough to the first speaker of the playback device that the barrier may affect the audio output of the first speaker. The threshold proximity may be established based on one or more various characteristics of the playback device such as the type of the speaker and/or the volume of playback. The threshold proximity may be predetermined or, alternatively, the threshold proximity may be configurable. In an embodiment, the threshold proximity may indicate a physical distance from the playback device.

Returning to FIG. 6, playback device 600 may detect whether left wall 622 is within a threshold proximity to speaker 602. The detection may be based on an indication in the proximity data from proximity sensors 610 that left wall 622 is proximate. In an example, the threshold proximity may be predetermined as 10 cm. In the example, the playback device detects whether left wall 622 is within 10 cm from speaker 608. Playback device 600 may similarly detect whether right wall 624 is within the threshold proximity to speaker 608. It should be understood that proximity sensors typically measure distance from the proximity sensor to an object. Therefore, in another example arrangement, a proximity sensor may be arranged near to a speaker so that the distance from the proximity sensor to a barrier approximates the distance from the speaker to the barrier. In FIG. 6, speaker 608 and proximity sensor 612 are shown in this type of arrangement.

The playback device may include a data storage, such as memory 206 in FIG. 2, that has data indicating a frequency response of the playback device stored thereon. The playback device may be configured to retrieve the frequency response from the data storage as appropriate.

The frequency response may be an approximation of an ideal frequency response of the playback device. For instance, the frequency response may be the frequency response of the playback device in open space. Alternatively, the frequency response may be a typical frequency response of playback devices of a particular type produced by a manufacturer.

In another embodiment, the playback device is configured to determine the frequency response of the playback device. For example, as noted above, the playback device may output an audio signal and receive back data indicative of the audio signal. The playback device may determine the frequency response of the playback device based on the received data indicative of the audio signal. The determined frequency response may be stored in the data storage.

Determining the frequency response may be an aspect of a set-up procedure. For example, during the set-up procedure, a user of the playback device may be instructed to place the playback device in a particular arrangement so that the playback device may determine a frequency response. The particular arrangement may involve placing the playback device on a surface without any objects nearby that could significantly affect the audio output of the device. Such an arrangement may approximate a frequency response of the playback device in open space.

In some embodiments, each speaker of the playback device may have a respective frequency response. In an embodiment, the frequency response of each speaker may be stored in the data storage. In another embodiment, the frequency response of each speaker may be determined by the playback device. Other examples are possible as well.

Figure 8:
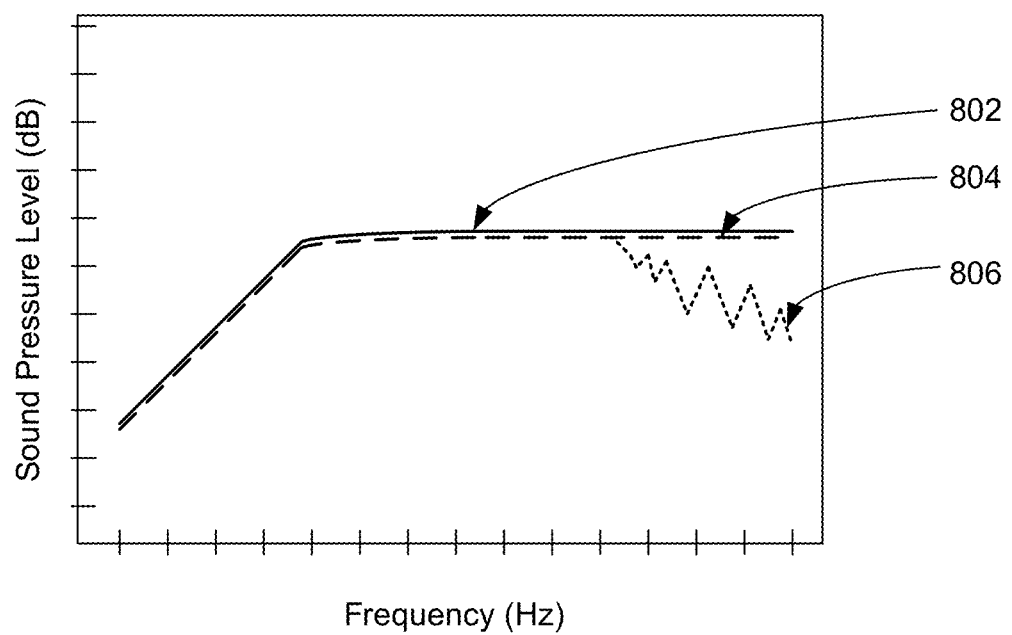
FIG. 8 shows example frequency responses of a playback device.

FIG. 8 shows example frequency responses of playback device 700 of FIG. 7 depicted as plots. Frequency response 802 is an example frequency response of speaker 704 that has been determined when playback device 700 was positioned in open space without any barriers nearby. Frequency response 804 is an example frequency response of speaker 702 as arranged in FIG. 7. As shown in FIG. 8, frequency response 804 closely tracks frequency response 802.

As further shown in FIG. 8, frequency response 806 is an example frequency response of speaker 704 as arranged in FIG. 7. As shown in the plot, frequency response 806 is distorted at higher frequencies. This distortion is caused by barrier 720. Typically, if a barrier causes an effect on the audio output of the playback device, the higher frequency range is affected by the barrier more than the lower frequencies. Lower frequency sound may be less affected by the barrier because lower frequency sounds generally propagates better than high frequency sound through materials.

Detecting that a barrier is within a threshold proximity may involve the frequency response. The playback device may determine a frequency response of a system that includes the playback device and the barrier (and possibly other objects in the vicinity of the playback device). After determining the frequency response of the system, the playback device may determine whether a difference between the frequency response of the playback device and the frequency response of the system is greater than a first distortion threshold.

The difference between the frequency response of the playback device and the frequency response of the system may take different forms. For example, the difference may be a percentage difference from the frequency response of the system. In such an embodiment, the first distortion threshold may be a particular percentage, such as 5%. Alternatively, the difference between the frequency response of the playback device and the frequency response of the system may be an absolute difference. For instance, the difference may be an absolute difference the frequency response of the playback device and the frequency response of the system at any frequency (or frequency range). Alternatively, the difference may be the total distortion averaged across the frequency spectrum. Other examples are possible as well.

While in some instances, for the purpose of example and explanation, the barrier is described as affecting the frequency response of the playback device, one having skill in the art will appreciate that the barrier does not change the frequency response of the playback device itself. Instead, the introduction of the barrier causes an effect on the perceived frequency response from the perspective of a listener. In other words, when the playback device itself defines a system, the barrier does not change the frequency response of that system. However, if the barrier is considered part of the system, the frequency response of the system that includes the playback device and the barrier is different from the frequency response of the system that includes only the playback device itself.

In some embodiments, detecting that the barrier is within a threshold proximity to a first speaker of the playback device may involve determining that the barrier satisfied a gating condition. For instance, the playback device may determine that the barrier has been within the threshold proximity to the first speaker of the playback device for an interval of time, such as 30 seconds, and has thereby satisfied the gating condition. Alternatively, the gating condition may be based on user input. The gating condition may prevent too frequent or undesirable adjustment of the playback configuration of the playback device due to temporary barriers. For instance, when a person moves in front of a speaker and thereby acts as a barrier, the gating condition may provide some delay before the playback configuration of the playback device is set. During the delay, the person may move away from in front of the speaker and therefore no longer act as a barrier.

c. Setting a Playback Configuration of the Playback Device

At block 506, based on the detection that the barrier is within a threshold proximity to a first speaker of the playback device, the playback device sets a playback configuration of the playback device. Setting the playback configuration may involve a variety of operations such as deactivating a speaker of the playback device or adjusting a component of audio content played by the playback device.

Setting a playback configuration of the playback device may involve causing the first speaker of the playback device to be deactivated. The playback device may deactivate the first speaker. Alternatively, the playback device may send a command to deactivate the first speaker. For example, referring to FIG. 7, speaker 704 may be considered the first speaker. Based on detecting that barrier 720 is within a threshold proximity to speaker 704, playback device 700 may deactivate speaker 704.

The first speaker of the playback device may be configured to play a component of the audio content. In one embodiment, the component of the audio content may be a specific frequency range. For instance, the first speaker may be a subwoofer and the component may be the low frequency range of the audio content. Alternatively, the first speaker may be a tweeter and the component may be the high frequency range of the audio content. In another embodiment, the audio content may be multi-channel audio, such as a stereo recording. For instance, with a stereo recording, the component of the audio content may be a right channel component of the stereo recording or a left channel component of the stereo recording.

After causing the first speaker to be deactivated, the playback device may cause a second speaker of the playback device to play the component of the audio content. For example, referring to FIG. 7, if the playback device deactivates speaker 704 where speaker 704 was configured to play a particular component of an audio content, the playback device may cause speaker 702 to play the particular component. It should be understood that causing a second speaker of the playback device to play the component after the condition of causing the first speaker to be deactivated may involve a brief overlap where the second speaker plays the component before the first speaker is deactivated.

In some embodiments, the first speaker has a first output direction and the second speaker has a second output direction that is different from the first output direction. For example, in FIG. 6, the output direction of speaker 602 is to the left of playback device 600 while the output direction of speaker 604 is to the front of playback device 600. In such an embodiment, causing a second speaker to play the component of the audio content may involve modifying the component of the audio content based on at least the second output direction. For instance, if the playback device causes speaker 604 to play the component of the audio content, the playback device may increase the volume of the component. Alternatively, the playback device may alter one or more frequency components of the component. In another alternative, the playback device may play a different component of the audio content. Modifications to the component may help to offset the change in the overall playback characteristics of the audio content on playback device 600 when speaker 602 is deactivated.

Setting the playback configuration of the playback device may involve adjusting the component of the audio content based on the received proximity data. For example, when the playback device is playing the audio content at one volume level, the playback device may adjust the particular volume of the component of the audio content. The playback device may vary the amount that the volume is adjusted based on the received proximity data. For instance, if proximity data indicates that a particular barrier is relatively near to the playback device (or a speaker thereof), the playback device may adjust the volume by a greater amount than if the proximity data indicated that barrier is relatively further from the playback device. Alternatively, the playback device may alter one or more frequency components of the component. For instance, if the proximity data indicates that a particular barrier is relatively near to the playback device (or a speaker thereof), the playback device may adjust the both the high range and the mid-range. In contrast, if the proximity data indicated that barrier is relatively further from the playback device, the playback device may adjust the high range. Other alternatives are possible as well.

Adjusting the component of the audio content based on the received proximity data may involve adjusting one or more frequency components of the component of the audio content. For example, referring to FIG. 8, frequency response 806 of speaker 704 is distorted at higher frequencies by barrier 720. The component of audio played by speaker 704 may be adjusted based on the distortion at higher frequencies. Adjusting one or more frequency components may involve filtering the one or more frequency components. For instance, a low pass filter may be applied to the component of audio played by speaker 704 to diminish the distortion caused by barrier 720.

In some embodiments, the playback device operates according to a second distortion threshold that is of a higher distortion than the first distortion threshold. In such embodiments, the playback device may adjust a component of the audio content to be played by the first speaker based on the received proximity data when the frequency response of the playback device is distorted above the first distortion threshold by the barrier. As noted above, adjusting a component of the audio content may involve adjusting volume or adjusting frequency components, among other possible examples.

Further, the playback device may cause the first speaker to be deactivated when the frequency response of the playback device is distorted above the second distortion threshold by the barrier. In this arrangement, the action taken by the playback device in the presence of distortion caused by a barrier is graduated. At or above the first distortion threshold, the playback device may adjust the audio content. As distortion increases to the second distortion threshold or above, the playback device may deactivate the first speaker. Other examples of graduated responses are possible as well.

In some embodiments, the playback device (and the first speaker) may be part of a playback system that includes a second playback device (which may include the second speaker). The playback device may set the playback configuration of the at least one additional playback device based on the detection that the barrier is within a threshold proximity to a first speaker of the playback device. For instance, after deactivating the first speaker, the playback device may send a message to the second playback device play at least a portion of the component of the audio content that was to be played by the first speaker.

The playback device may be a component of a media playback system, such as media playback system 100 of FIG. 1. The media playback system may include the playback device and a controller. The playback device may send an indication of the barrier that is proximate to the playback device to the controller of the media playback system. For example, the controller may be control device 300 of FIG. 3. In some embodiments, the playback device may send the indication in response to setting the playback configuration of the playback device. The playback device may send the indication of the barrier over a network interface, such as network interface 214 of FIG. 2.

Figure 9:
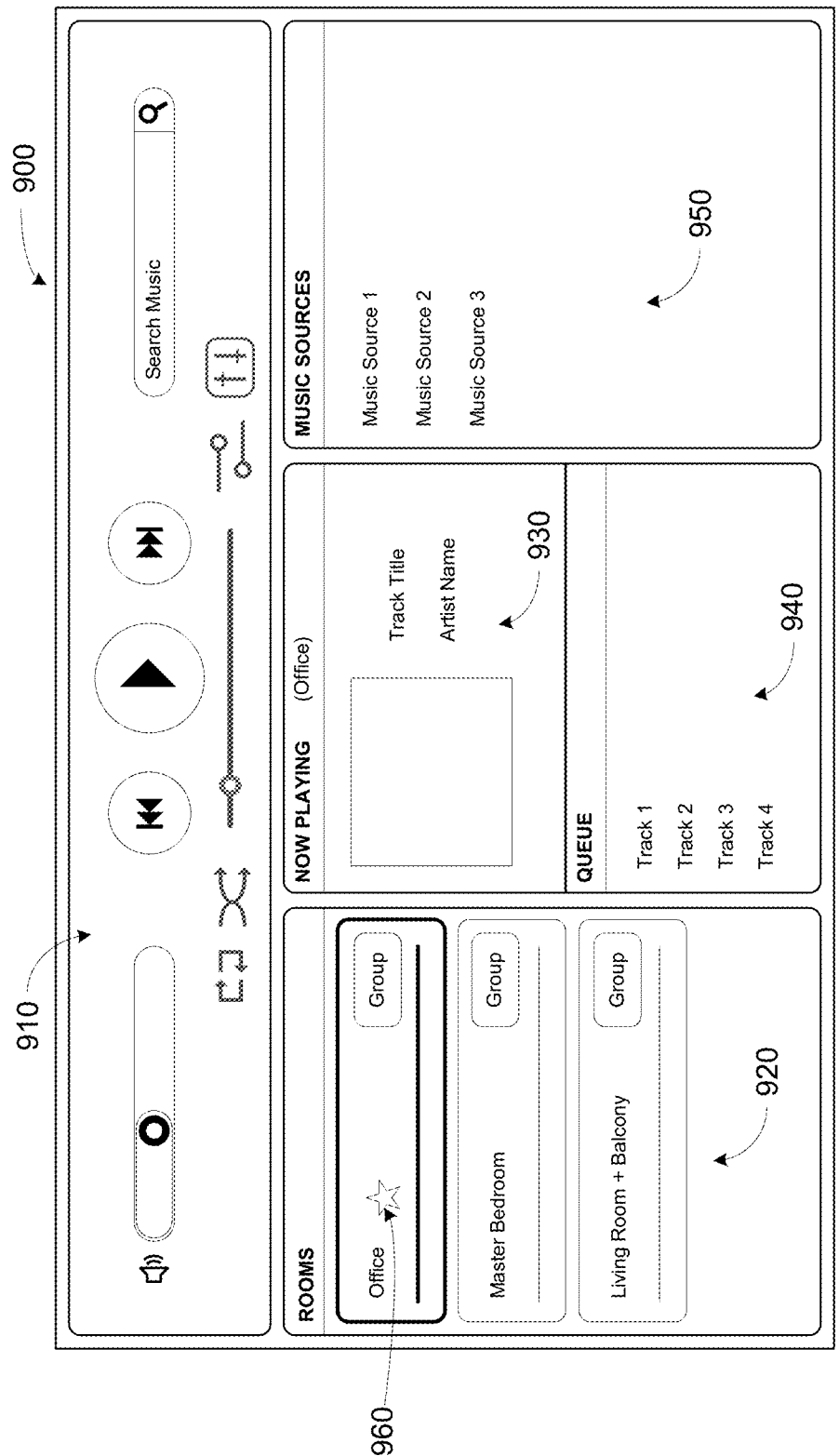
FIG. 9 shows an example controller interface including an indication of a barrier.

The controller may display a representation of the indication of the barrier on an interface of the controller. FIG. 9 shows an example controller interface 900. Similar to the example controller interface 400 in FIG. 4, controller interface 900 includes a playback control region 910, a playback zone region 920, a playback status region 930, a playback queue region 940, and an audio content sources region 950. Controller interface 400 also includes a representation 960 of the indication of the barrier. In an embodiment, representation 960 is selectable. When selected, controller interface 900 may display information about the barrier. In one embodiment, the information may include at least an indication of the specific speaker that is affected by the barrier.

The controller may display a representation indicating the playback configuration. For instance, the representation may indicate that a particular speaker is deactivated. The controller may also display a control interface that allows a user to accept or reject the playback configuration. Further, the controller may also display an indication that allows a user to set the playback device to dynamically adjust the playback configuration.

The playback device may output an alert sound based on detecting that a barrier is within a threshold proximity. The alert sound may be configured such that a user of the playback device may realize that a barrier may be affecting audio output of the playback device upon hearing the alert sound. For example, the alert sound may be a beep or a sequence of beeps. Or, the alert sound may be a pre-recording voice stating an alert. Other examples are possible as well. When a barrier is affecting a particular speaker of the playback device, the playback device may output the alert sound from the particular speaker affected by the barrier.

d. Causing the Playback Device to Play an Audio Content According to the Playback Configuration At block 508, the playback device causes the playback device to play an audio content according to the playback configuration. For example, where setting the playback configuration of the playback device involves causing the first speaker of the playback device to be deactivated, the playback device plays the audio content while the first speaker of the playback device is deactivated. Or, as another example, where setting the playback configuration of the playback device involves adjusting a component of the audio content, the playback device plays the audio content with the component of the audio content adjusted.

The audio content may be any audio content such as the example audio content discussed above with respect to the example playback devices and/or the example audio content sources, among other alternatives. As noted above, the audio content may be a multi-channel audio recording, such as a stereo recording.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves configuring a playback device based on the detection of a barrier in proximity to the playback device. In one aspect, a method is provided. The method involves a playback device receiving proximity data that includes an indication of a barrier that is proximate to a playback device. The method further involves the playback device detecting that the barrier is within a threshold proximity to a first speaker of a playback device based on the indication of the barrier proximate to the playback device. In response to the detecting, the method involves setting a playback configuration of the playback device. The method also involves causing the playback device to play an audio content according to the playback configuration.

In another aspect, a playback device is provided. The playback includes a first speaker, a second speaker, a processor, a data storage, and a program logic. The program logic is stored in the data storage and executable by the processor to receive proximity data that includes an indication of a barrier that is proximate to a playback device and detect that the barrier is within a threshold proximity to the first speaker based on the indication of the barrier proximate to the playback device, where the first speaker is configured to play a component of an audio content. In response to the detecting, the program logic is further executable to (i) cause the first speaker to be deactivated and (ii) cause the second speaker to play the component of the audio content.

In yet another aspect, a non-transitory computer readable memory is provided. The non-transitory computer readable memory has stored thereon instructions executable by a playback device to cause the playback device to perform functions. The functions include receiving proximity data that includes an indication of a barrier that is proximate to a playback device, and detecting that the barrier is within a threshold proximity to a first speaker of a playback device based on the indication of the barrier proximate to the playback device. In response to the detecting, the functions further include setting a playback configuration of the playback device; and causing the playback device to play an audio content according to the playback configuration.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
   one or more processors;
   one or more speakers;
   one or more microphones; and
   tangible, non-transitory, computer-readable media having instructions encoded therein, wherein the instructions, when executed by the one or more processors, cause the playback device to perform a method comprising
   outputting, via at least one of the one or more speakers, an audio pulse;
   receiving proximity data that includes an indication of a barrier that is proximate to the playback device, wherein receiving the proximity data comprises: receiving data indicative of a reflected audio pulse via at least one of the one or more microphones, and wherein the reflected audio pulse corresponds to the outputted audio pulse;
   detecting that the barrier is within a threshold proximity to a first speaker of the playback device based on the indication of the barrier that is proximate to the playback device;
   based on the detecting, setting a playback configuration of the playback device; and
   causing the playback device to play an audio content according to the playback configuration.

2. The playback device of claim 1, wherein setting a playback configuration of the playback device comprises:
   causing the first speaker of the playback device to be deactivated.

3. The playback device of claim 2, wherein the first speaker of the playback device is configured to play a component of the audio content, the method further comprising:
   after causing the first speaker to be deactivated, causing a second speaker of the playback device to play at least a portion of the component of the audio content.

4. The playback device of claim 3, wherein the first speaker has a first output direction, wherein the second speaker has a second output direction that is different from the first output direction of the first speaker, and wherein causing a second speaker to play at least a portion of the component of the audio content further comprises:
   modifying the at least a portion of the component of the audio content based on at least the second output direction.

5. The playback device of claim 3, wherein the audio content is a stereo recording, and wherein the component of the audio content is one of: (i) a right channel component of the stereo recording or (ii) a left channel component of the stereo recording.

6. The playback device of claim 1, wherein the first speaker is configured to play a component of the audio content, and wherein setting a playback configuration of the playback device comprises:
   adjusting the component of the audio content based on the received proximity data.

7. The playback device of claim 6, wherein adjusting the component of the audio content based on the received proximity data comprises:
   adjusting one or more frequency components of the component of the audio content.

8. The playback device of claim 1, wherein the playback device has a frequency response, and wherein detecting that the barrier is within a threshold proximity to the first speaker of the playback device based on the indication of the barrier that is proximate to the playback device comprises:
   determining a frequency response of a system, wherein the system comprises the playback device and the barrier; and
   determining whether a difference between the frequency response of the playback device and the frequency response of the system is greater than a first distortion threshold.

9. The playback device of claim 8, wherein the playback device further operates according to a second distortion threshold that is of a higher distortion than the first distortion threshold, the method further comprising:
   adjusting a component of the audio content to be played by the first speaker based on the received proximity data when the frequency response of the playback device is distorted above the first distortion threshold by the barrier; and
   causing the first speaker to be deactivated when the frequency response of the playback device is distorted above the second distortion threshold by the barrier.

10. The playback device of claim 1, wherein the playback device is a component of a media playback system, and wherein the media playback system comprises the playback device and a controller, the method further comprising:
    in response to setting the playback configuration of the playback device, sending an indication of the barrier that is proximate to the playback device to the controller of the media playback system.

11. A method comprising:
    outputting, via at least one speaker of a playback device, an audio pulse;
    receiving proximity data that includes an indication of a barrier that is proximate to the playback device, wherein receiving the proximity data comprises: receiving data indicative of a reflected audio pulse via at least one microphone, and wherein the reflected audio pulse corresponds to the outputted audio pulse;
    detecting that the barrier is within a threshold proximity to a first speaker of the playback device based on the indication of the barrier that is proximate to the playback device, wherein the first speaker is configured to play a component of an audio content; and
    based on the detecting, (i) causing the first speaker to be deactivated and (ii) causing a second speaker of the playback device to play the component of the audio content.

12. The method of claim 11, wherein the first speaker has a first output direction, wherein the second speaker has a second output direction that is different from the first output direction of the first speaker, and wherein causing a second speaker to play at least a portion of the component of the audio content further comprises:

modifying the at least a portion of the component of the audio content based on at least the second output direction.

13. The method of claim 11, wherein the audio content is a stereo recording, and wherein the component of the audio content is one of: (i) a right channel component of the stereo recording or (ii) a left channel component of the stereo recording.

14. The method of claim 11, further comprising:
adjusting the component of the audio content based on the received proximity data.

15. The method of claim 11, wherein the playback device has a frequency response, and wherein detecting that the barrier is within a threshold proximity to the first speaker of the playback device based on the indication of the barrier that is proximate to the playback device comprises:
determining a frequency response of a system, wherein the system comprises the playback device and the barrier; and
determining whether a difference between the frequency response of the playback device and the frequency response of the system is greater than a first distortion threshold.

16. The method of claim 15, wherein the playback device further operates according to a second distortion threshold that is of a higher distortion than the first distortion threshold, the method further comprising:
adjusting a component of the audio content to be played by the first speaker based on the received proximity data when the frequency response of the playback device is distorted above the first distortion threshold by the barrier; and
causing the first speaker to be deactivated when the frequency response of the playback device is distorted above the second distortion threshold by the barrier.

17. A non-transitory computer-readable storage medium including a set of instructions for execution by a processor, the set of instructions, when executed, cause a playback device to perform operations comprising:
outputting, via at least one of speaker, an audio pulse;
receiving proximity data that includes an indication of a barrier that is proximate to the playback device, wherein receiving the proximity data comprises: receiving data indicative of a reflected audio pulse via at least one microphone, and wherein the reflected audio pulse corresponds to the outputted audio pulse;
detecting that the barrier is within a threshold proximity to a first speaker of the playback device based on the indication of the barrier that is proximate to the playback device;
based on the detecting, setting a playback configuration of the playback device; and
causing the playback device to play an audio content according to the playback configuration.

18. The non-transitory computer-readable storage medium of claim 17, wherein setting a playback configuration of the playback device comprises causing the first speaker of the playback device to be deactivated, wherein the first speaker of the playback device was configured to play a component of the audio content; and wherein the operations further comprise:
after causing the first speaker to be deactivated, causing a second speaker of the playback device to play at least a portion of the component of the audio content.

19. The non-transitory computer-readable storage medium of claim 18, wherein the first speaker has a first output direction, wherein the second speaker has a second output direction that is different from the first output direction of the first speaker, and wherein causing a second speaker to play at least a portion of the component of the audio content further comprises:
modifying the at least a portion of the component of the audio content based on at least the second output direction.

20. The non-transitory computer-readable storage medium of claim 18, wherein the audio content is a stereo recording, and wherein the component of the audio content is one of: (i) a right channel component of the stereo recording or (ii) a left channel component of the stereo recording.

21. The non-transitory computer-readable storage medium of claim 17, wherein the first speaker is configured to play a component of the audio content, and wherein setting a playback configuration of the playback device comprises:
adjusting one or more frequency components of the component of the audio content.

22. The non-transitory computer-readable storage medium of claim 17, wherein the playback device has a frequency response, and wherein detecting that the barrier is within a threshold proximity to the first speaker of the playback device based on the indication of the barrier that is proximate to the playback device comprises:
determining a frequency response of a system, wherein the system comprises the playback device and the barrier; and
determining whether a difference between the frequency response of the playback device and the frequency response of the system is greater than a first distortion threshold.

23. The non-transitory computer-readable storage medium of claim 22, wherein the playback device further operates according to a second distortion threshold that is of a higher distortion than the first distortion threshold, the operations further comprising:
adjusting a component of the audio content to be played by the first speaker based on the received proximity data when the frequency response of the playback device is distorted above the first distortion threshold by the barrier; and
causing the first speaker to be deactivated when the frequency response of the playback device is distorted above the second distortion threshold by the barrier.

24. The non-transitory computer-readable storage medium of claim 17, wherein the playback device is a component of a media playback system, and wherein the media playback system comprises the playback device and a controller, the operations further comprising:
in response to setting the playback configuration of the playback device, sending an indication of the barrier that is proximate to the playback device to the controller of the media playback system.

* * * * *